United States Patent
Hohkibara et al.

(10) Patent No.: US 6,438,436 B1
(45) Date of Patent: Aug. 20, 2002

(54) PRODUCTION SCHEDULING MANAGEMENT SYSTEM, AND METHOD OF MANAGING PRODUCTION SCHEDULING

(75) Inventors: Shinichi Hohkibara; Etsuo Fukuda; Hiroshi Nanami, all of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/250,388

(22) Filed: Feb. 16, 1999

(30) Foreign Application Priority Data

Feb. 17, 1998 (JP) .......................................... 10-035031

(51) Int. Cl.⁷ .............................................. G06F 19/00
(52) U.S. Cl. ............................ 700/97; 700/100; 700/99
(58) Field of Search .................................. 700/121, 128, 700/229, 116, 113, 83, 17, 180, 100, 94, 97

(56) References Cited

U.S. PATENT DOCUMENTS

| | | | |
|---|---|---|---|
| 5,237,508 A | * | 8/1993 | Furukawa et al. .......... 700/100 |
| 5,278,750 A | * | 1/1994 | Kaneko et al. ................ 705/8 |
| 5,402,349 A | * | 3/1995 | Fujita et al. .................. 700/97 |
| 5,442,561 A | * | 8/1995 | Yoshizawa et al. ......... 700/100 |
| 5,787,000 A | * | 7/1998 | Lilly et al. ..................... 700/95 |
| 5,818,716 A | * | 10/1998 | Chin et al. .................. 700/100 |
| 5,826,040 A | * | 10/1998 | Fargher et al. ................ 705/8 |
| 5,826,236 A | * | 10/1998 | Narimstu et al. .............. 705/8 |

* cited by examiner

Primary Examiner—Leo Picard
Assistant Examiner—Chad Rapp
(74) Attorney, Agent, or Firm—Finnegan, Henderson, Farabow, Garrett & Dunner, L.L.P.

(57) ABSTRACT

A production scheduling management system includes: a long-range production scheduling unit that receives long-range production scheduling information including at least information on a delivery date of each lot, produces a lot processing schedule based on the delivery date of each lot, and outputs a long-range production schedule; a short-range production scheduling unit that receives the long-range production schedule and short-range production scheduling information, produces a short-range schedule of lot processing so as to fulfill the long-range production schedule, and outputs a short-range production schedule; and a work scheduling unit that receives the short-range production schedule and work scheduling information, produces a work schedule so as to fulfill the short-range production schedule, while taking account of conditions of each machine and conditions of each lot, and generates work schedule.

9 Claims, 13 Drawing Sheets

PRODUCTION SCHEDULING MANAGEMENT SYSTEM, AND METHOD OF MANAGING PRODUCTION SCHEDULING

BACKGROUND OF THE INVENTION

1. Field of the Invention

The present invention relates to a production scheduling management system and a method of managing production scheduling, and in particular to a technique for minimizing influences on lot processing schedules.

2. Description of Related Art

A plurality of lots each containing a plurality of silicon wafers are present in a semiconductor production line in which each lot is transported and processed as a unit. Semiconductors are subjected to several hundreds of processes, to provide final products. The production scheduling for a semiconductor production line is performed by tracking the current position of each of the lots in the production line.

In each process of semiconductor manufacturing, it is determined which lot or lots is/are waiting for processing at the current point of time. Also, a production management system manages the expected date and desired date (delivery date) on which processing of all products is expected to be completed.

FIG. 1 is a schematic view useful in explaining a related technology of production scheduling management method. Suppose some lots, which have been processed in the previous process step, are now ready to be processed in the next process step. A CR (Clean Room) operator in charge of each process selects a certain number of lots that can be processed at a time, from a plurality of lots that are waiting for processing, and executes the process on the selected lots. Where a CR operator A finishes processing some lots, as shown in FIG. 1 by way of example, the lots are transported or moved to a job location managed by a CR operator B in charge of the next process. The CR operator B then determines which lot or lots is/are to be processed first, based on the lot delivery date and other information.

Each CR operator selects the lot(s) to be processed next, based on the order in which the lots reach the relevant process managed by the operator, or on the order that is determined in terms of the delivery date of each lot under control of the production scheduling system. Based on these criteria, priority rating is given to the lots that are waiting for processing, namely, the lots waiting for processing are arranged in the order of priority in which processing of the lots is to be started, and the CR operator executes the process according to the order thus determined.

The production scheduling management method as described above, however, suffers from the following problems:

(1) The order of priority in which the process is executed is determined with respect to all of the lots that are waiting for processing. Namely, the priority rating does not involve lots that still remain in any one of the processes prior to the relevant process. In this case, if a higher-priority lot reaches the relevant process immediately after the process starts being executed, for example, the lot must be kept waiting for processing for a long time in spite of the fact that the higher priority is given to the lot, resulting in a delay in processing the lot.

(2) In a process step in which batch processing is employed, namely, where a process is executed on a batch of lots at a time, so-called charging is performed in which a processing machine or apparatus is charged with a plurality of lots (batch) that are to be processed under the same conditions, so that the batch of lots is processed at the same time. In this type of process, it is highly desirable to charge the processing machine with the maximum number of lots that are allowed to be set in the machine, so as to improve the performance or efficiency of the machine.

If the above-described charging is performed only with respect to the lots that are currently waiting for processing, however, the case as follows often arises: the process is executed while the processing machine has not been charged with the maximum permissible number of lots, and more lots that can be processed under the same conditions reach the relevant process immediately after the process starts being executed. In such a case, the efficiency of lot processing is considerably reduced or deteriorated.

(3) While the lots waiting for processing are considered as being in the order of priority in which the next processing is to be started, there is no concept of time with respect to these lots, namely, there is no limit to the time by which each lot should start being processed. In the meantime, routine or non-routine maintenance is performed on each manufacturing apparatus or machine, and such maintenance may cause a delay in the progress of lots that are to be processed by the apparatus. Since there is no limit to the time by which the lots waiting for processing should start being processed, the operator may inadvertently perform maintenance of the apparatus, thus causing a problem in carrying out lot processing schedules.

(4) The progress of lots may also be disturbed or impeded by faults, troubles, or other unexpected incidents of manufacturing apparatuses. Where such an incident causes a delay in the progress of lots, with a result being behind lot processing schedules, there arises a need to review and revise the lot processing schedules. Since it takes a great amount of time to reschedule the progress of lots, the schedules are less frequently reviewed for rescheduling, and the order of priority as described above may be inappropriately determined according to the delayed schedules.

SUMMARY OF THE INVENTION

The present invention was developed in the light of the situations as described above. It is therefore an object of the present invention to provide a production scheduling management system and method that enable preparations for production, such as production planning, to be accomplished with high efficiency, and properly carry out operations according to schedules, thereby to minimize influences on lot processing schedules. It is another object of the invention to provide a computer-readable storage medium containing such a production scheduling management method as (a) program(s).

To accomplish the above object, a production scheduling management system is provided, which comprises a production planning unit that receives production scheduling information including at least information on the delivery date of each lot, produces a production schedule of each lot, and outputs a production schedule; and a work scheduling unit that receives the production schedule and work scheduling information, produces a work schedule so as to fulfill the production schedule, while taking account of conditions of each machine and conditions of each lot, and generates at least one work schedule.

The order in which each lot starts being processed is determined in terms of time. Namely, the present production scheduling management system is characterized in that processing in each process step is scheduled with respect to lots that have not reached the relevant process step, as well as lots that are currently waiting for processing in this step. This enables the operator to be aware of the presence of a high-priority lot or lots that have not reached the process managed by the operator, and the time by which the high-priority lot(s) should start being processed in the process step. This arrangement avoids a situation in which the start of processing of the high-priority lots is delayed while other lots are being processed in the process step.

Since execution of each process is scheduled in terms of time, with respect to the lots that have not reached the relevant process step, as well as the lots waiting for processing, charging of the machine may be performed with high efficiency, taking account of the lots that have not reached the relevant process step, as well as the lots that are currently waiting for processing.

The present production scheduling management system has three or more scheduling units. For example, a short-range production scheduling unit may be provided so that the amount of lots processed in each step can be estimated, and maintenance works of each apparatus or machine can be scheduled to be conducted in such a period of time that does not affect the progress of lots. This avoids a delay in the lot processing schedule, which would otherwise occur when the operator inadvertently performs a maintenance work.

According to the production scheduling management system as described above, preparations, such as production planning, can be made with high efficiency, and scheduled works can be properly accomplished on time, while minimizing influences on the lot processing schedule.

BRIEF DESCRIPTION OF THE DRAWINGS

The objects, features and advantages of the present invention will become more apparent from a following description of one preferred embodiment taken in conjunction with the accompanying drawings, in which.

DETAILED DESCRIPTION OF EMBODIMENTS

Figure 1:
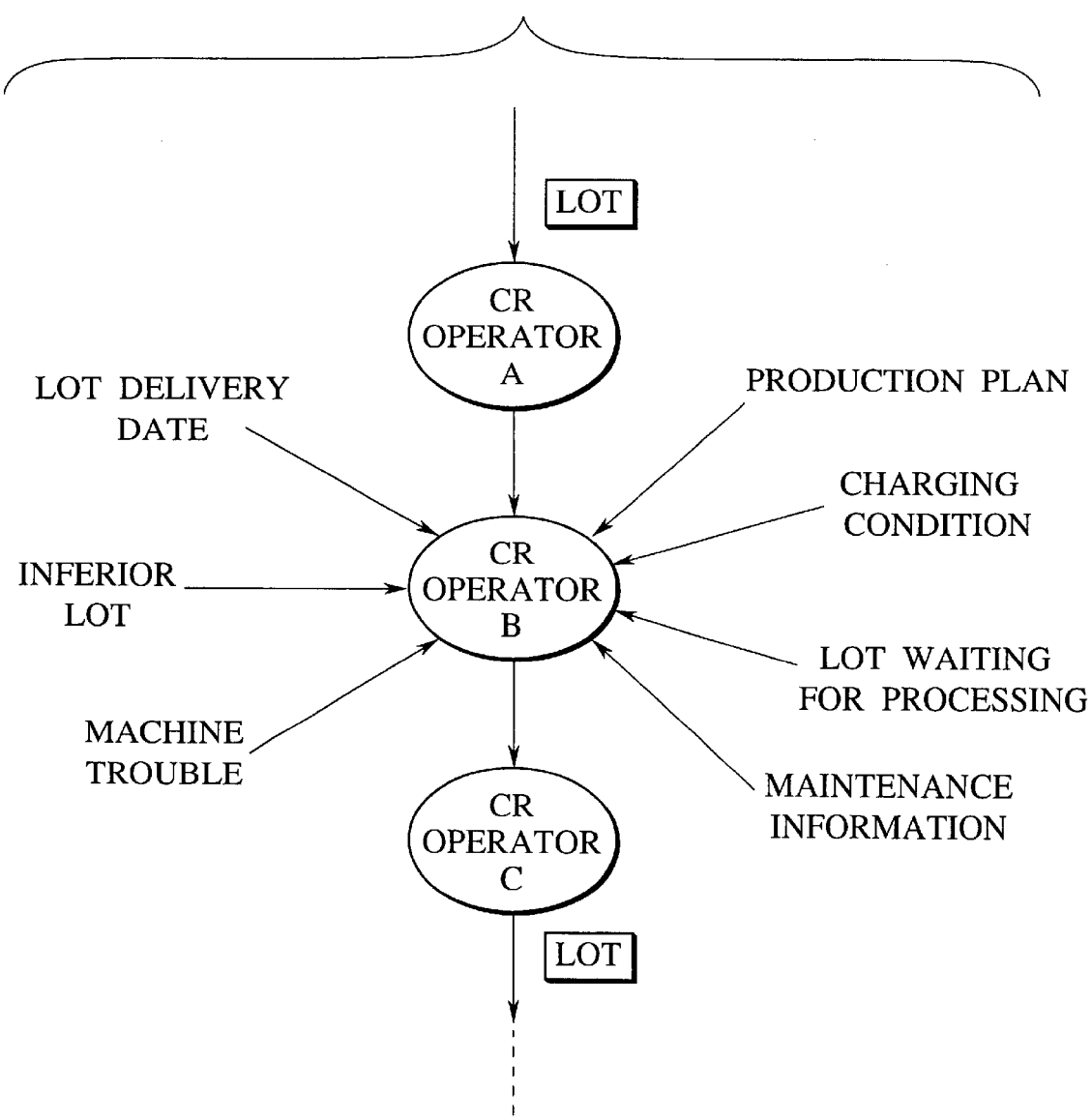
FIG. 1 is a view useful in explaining a related technology of production scheduling management method.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

To provide the production scheduling management system of the present embodiment, software that realizes the processing as described below is prepared, and a computer system is used for enabling implementation of the processing. The meaning the word "computer system" may include a main flame computer, workstation, PC, or the like. The hardware configuration of the computer system used in the present embodiment includes a CPU that performs various operations, an input device, such as a keyboard, mouse, light-pen, or a flexible disk device, an output device, such as a display or a printer, and others devices. The CPU includes an operating unit that processes commands associated with processing of each scheduling unit as explained later, and a main storage unit that stores the commands generated during the processing. The operating unit sequentially reads commands stored in the main storage unit, or external storage device, and executes the commands so as to perform processing for managing production scheduling.

Figure 2:
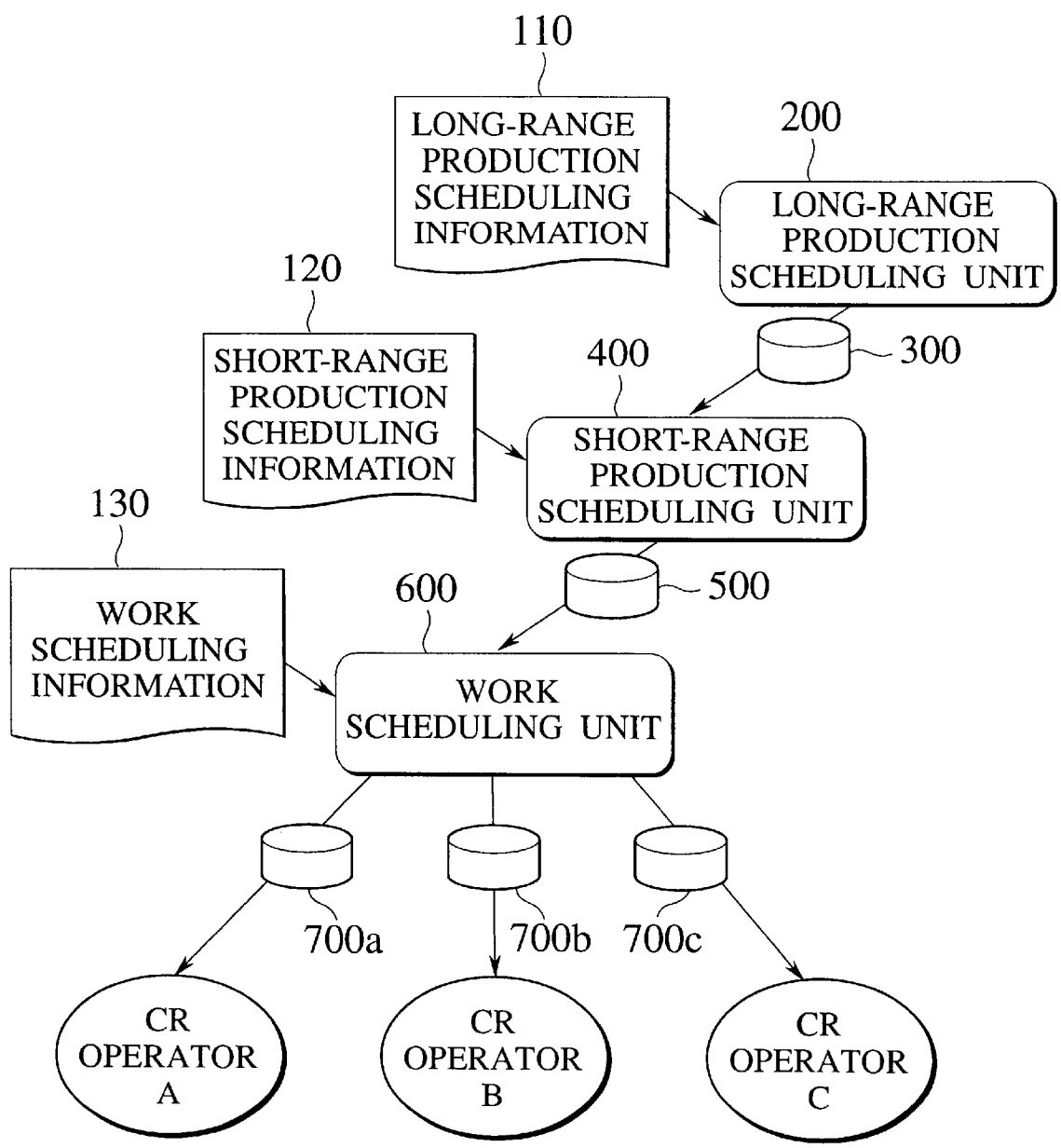
FIG. 2 is a block diagram showing a production scheduling management system of one preferred embodiment of the present invention.

FIG. 2 is a block diagram showing the production scheduling management system of the present embodiment. In the present embodiment, the production scheduling management system has a three-stage configuration, namely, includes a long-range production scheduling unit 200, a short-range production scheduling unit 400, and a work scheduling unit 600, as shown in FIG. 2. The long-range production scheduling unit 200 receives long-range production scheduling information 110 including at least information on the delivery date or time of each lot, makes a lot processing schedule (long-range production schedule) based on the delivery date of each lot, and outputs a long-range production schedule 300. The short-range production scheduling unit 400 receives the long-range production schedule 300 and short-range production scheduling information 120, makes a lot processing schedule (short-range production schedule) over a short period of time, in accordance with the long-range production schedule 300, and outputs a short-range production schedule 500. The work scheduling unit 600 receives the short-range production schedule 500 and work scheduling information 130, makes a schedule (work schedule) of works to be done by operators, in accordance with the short-range production schedule, while taking account of the conditions of machines and the conditions of each lot, and generates work schedules 700 to respective operators.

Each of the scheduling units in each stage of the production scheduling system performs simulation, so as to mange the progress of each lot. To this end, the order in which each lot starts being processed in each process step is determined in terms of the time by which the processing of the lot should be started. Namely, the present production scheduling management system is characterized in that the processing in each process step is scheduled with respect to lots that have not reached the process in question, as well as lots that are currently waiting for processing in the process step. This enables the operator to be aware of the presence of a high-priority lot or lots that have not reached the process managed by the operator, and the time by which the high-priority lot(s) should start being processed in the process step. This arrangement avoids a situation in which the start of processing of the high-priority lot(s) is delayed while other lots are being processed in the process step.

Since execution of each process is scheduled in terms of time, with respect to the lots that have not reached the relevant process, as well as the lots currently waiting for processing, charging of a machine used in the process may be performed with high efficiency, taking account of the lots that have not reached the relevant process, as well as the lots that are currently waiting for processing.

The present production scheduling management system is provided with the short-range production scheduling unit 400 as one of the three stages thereof, and is thus able to estimate the amount of lots to be processed in each process step, and make a plan for maintenance of the process machine, by determining a period of time during which the maintenance can be performed without affecting the progress of lots. This eliminates a possibility that the lot processing schedule is delayed due to a maintenance operation inadvertently performed by the operator as in the known system. For instance, if a higher-priority lot is expected to reach the process in question, the maintenance of the process machine may be scheduled to be performed after the higher-priority lot finishes being processed.

The work scheduling unit 600 performs its operations as needed, depending upon changes in the actual situations. Where a lot or lots is/are discharged out of the apparatus during processing thereof due to an unexpected fault or abnormality of the apparatus, the operator is only required to review or revise the work schedule on the basis of the production schedules of the scheduling units in the upper stages, with a reduced time required for rescheduling, and the resulting change in the work schedule can be promptly reflected by the order of priority in which the lots start being processed. Also, the operator is encouraged to review the work schedule more frequently, assuring a high accuracy with which the schedule is realized.

Next, each scheduling unit of the three-stage production scheduling management system will be described in detail.

Figure 3:
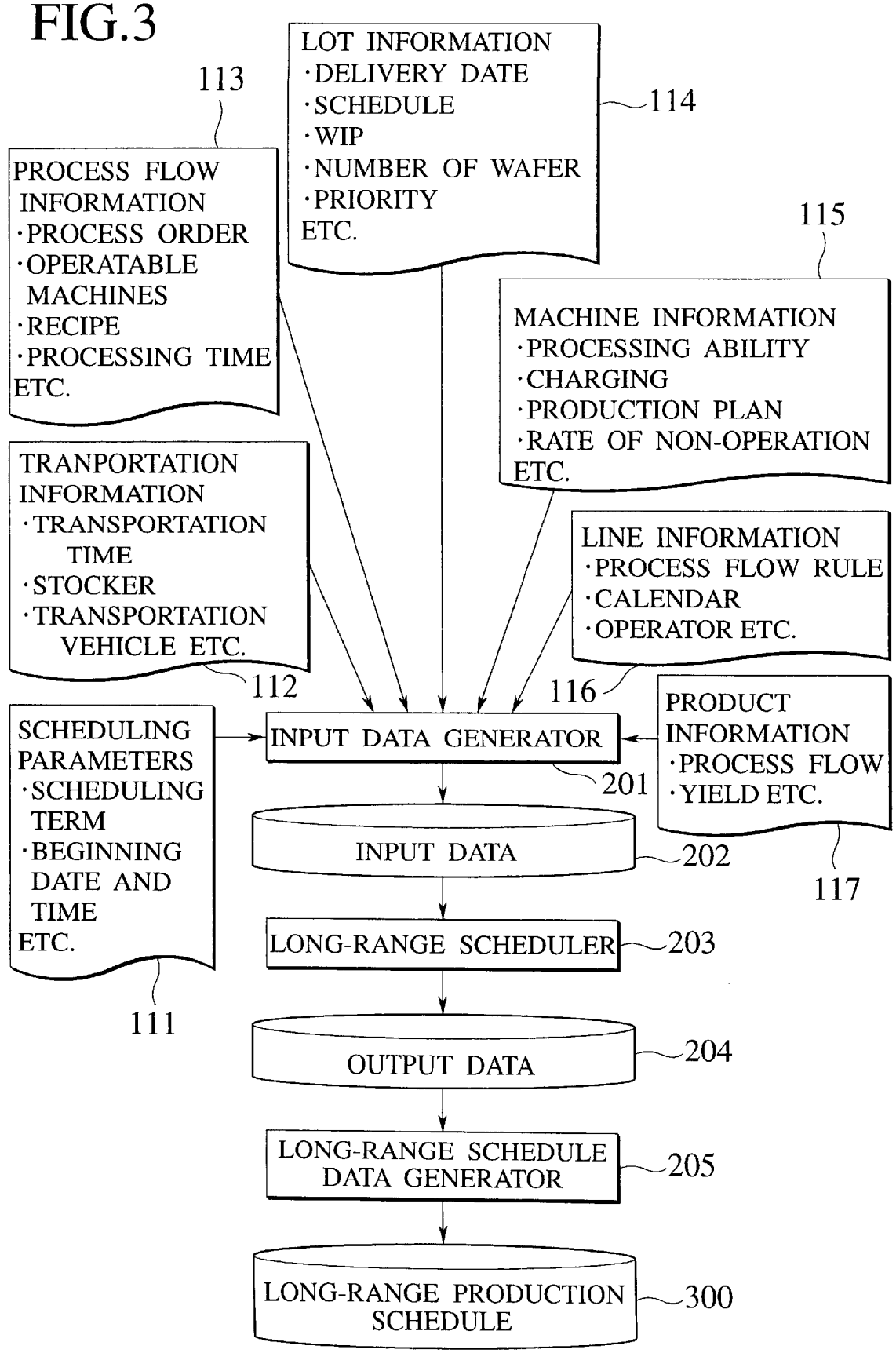
FIG. 3 is a block diagram showing the flow of processing of a long-range production scheduling unit 200 of FIG. 2.

FIG. 3 is a block showing the flow of processing of the long-range production scheduling unit 200. Initially, the long-range production scheduling information 110 includes scheduling parameters 111, transportation information 112 concerning transportation of lots, process flow information 113, lot information 114, machine information 115, production line information 116, and product information 117. The scheduling unit 200 may use a part of or all of these items of information.

The scheduling parameters 111 may include the scheduling term, the beginning date and time at which the schedule starts being carried out, and other information. The transportation information 112 may include the transportation time, information on a stocker and a transportation vehicle, and others. The process flow information 113 may include the order of process steps (process flow), information on a set of machines that may be used for processing, recipe, processing time, and other information. The lot information 114 may include the delivery date of each lot, schedule for setting the lot in each machine, the number of WIP (Work In Process) wafers in the current process step, priority factor, and other information. The machine information 115 may include the processing ability, charging, production plan of the machine, the rate of non-operation, and other information. The line information 116 may include the process flow rules, the operation calendar of the line, information on operators, and others. The product information 117 includes the process flow to be used, yield, and other information.

Using a part of or all of the long-range production information 110, an input data generator 201 for long-range scheduling generates data 202 to be received by a long-range scheduler 203. The long-range scheduler 203 then performs long-range scheduling, using the schedule data 202, and generates output data 204. Then, a long-range schedule data generator 205 generates a long-range production schedule 300, based on the output data 204 received from the long-range scheduler 203.

The long-range scheduler 203 incorporates an algorithm for processing each lot so as to meet its desired delivery date. The scheduler 203 simulates processing over a certain period of time, e.g., one month to twelve months, in which all of lots that are certain to be introduced into a machine of each process go through or complete the process. The frequency of simulation can be determined based on the timing of change or updating of a lot introduction schedule or desired lot delivery date. As a result of the simulation, the long-range scheduler 203 generates lot processing schedules for all of the lots. More specifically, the long-range scheduler 203 outputs "lot receiving time", "process start time", "process finish time", "lot discharge time" of each process, with respect to all of the lots to be processed in this process. The scheduler 203 also outputs estimated complete date (delivery date) of the final step of the process.

Figure 4:
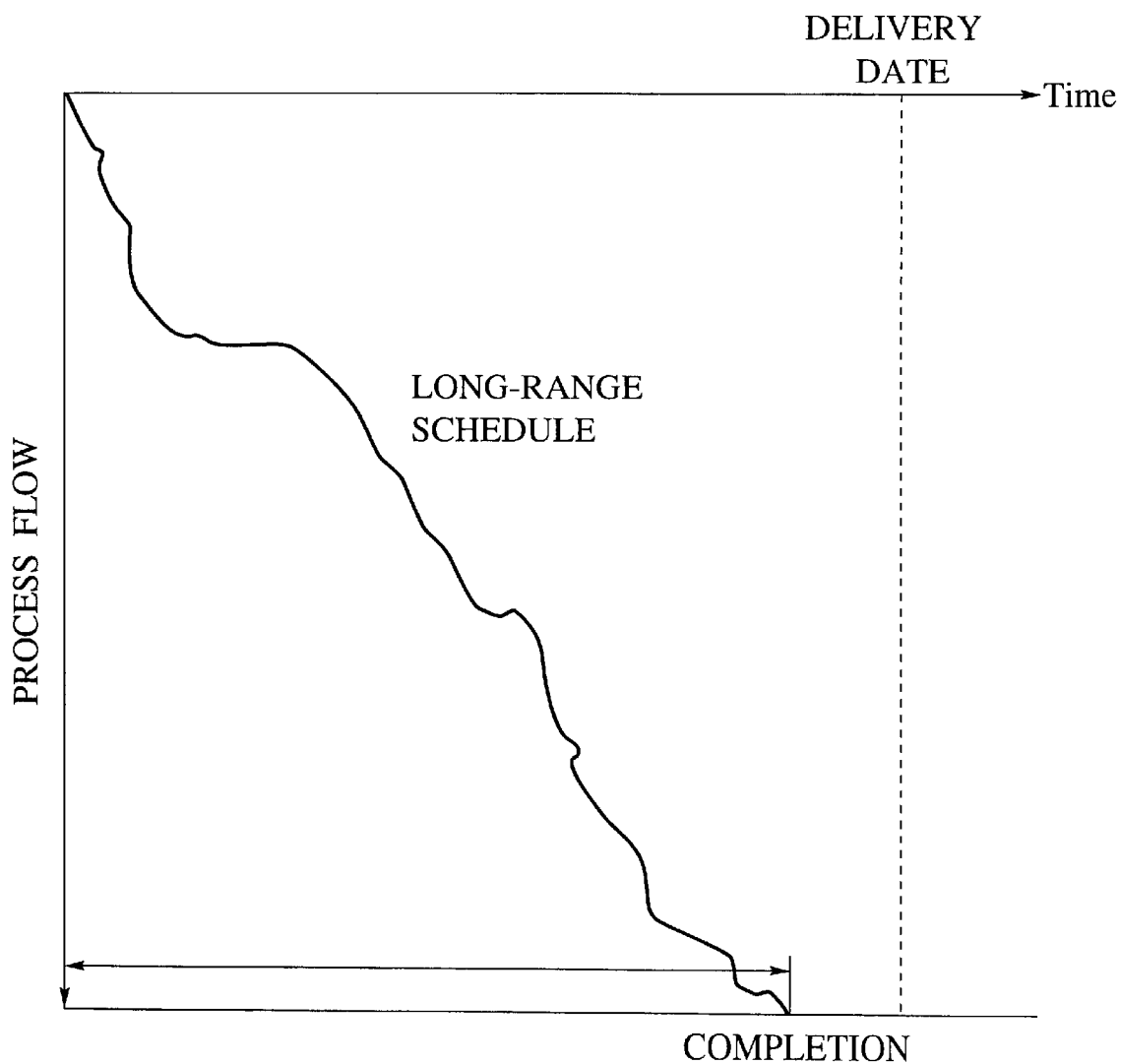
FIG. 4 is a graph useful in explaining the long-range production scheduling unit 200 of FIG. 2.

FIG. 4 is a graph useful in explaining a long-range production schedule. In FIG. 4, the vertical axis represents the process flow, and the horizontal axis represents the time. Each lot proceeds from one process to another (next process) as the plotted line in FIG. 4 goes downwards, and the time proceeds as the line goes to the right as viewed in the same figure. The long-range production scheduling unit 200 received information, such as the state of the production line at a certain point of time, expected or scheduled state of the line after that point of time, and the desired completion date (delivery date) of the whole process of each product (lot), and causes the long-range scheduler 203 to perform simulation of the progress of the lot over a designated period of time.

Figure 5:
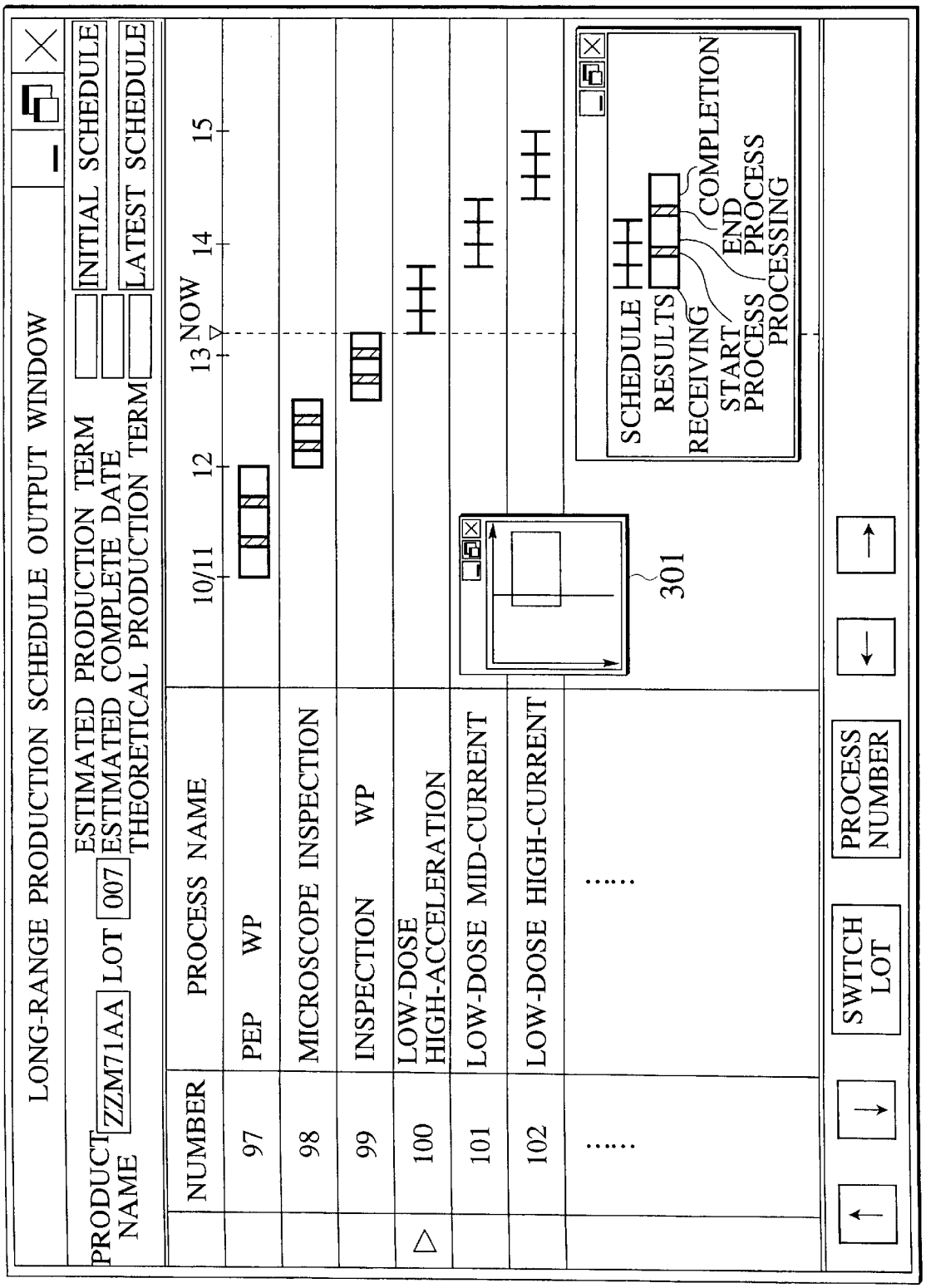
FIG. 5 is an example of a screen image showing a long-range production schedule.

FIG. 5 shows an example of screen image as an output result of long-range production scheduling that can be actually referred to by the user. In this example, the estimated production term, estimated completion date, theoretical production term, and others, are displayed in association with a particular lot that is identified by its product name. By re-entering a new. product name and a lot number, a long-range schedule of the lot newly entered can be seen on the screen. Since the production schedule may be changed during execution thereof, both initial schedule and updated schedule are displayed.

In the table located in the middle of the display, the vertical axis represents the process name, and the horizontal axis represents the time, and is graduated in dates. Each process name on the vertical axis is indicated along with the process number, and the result or schedule of each process is displayed. The table in the middle of the display may be scrolled up and down, and to the left and the right, by clicking a selected one of buttons denoted by "↑", "↓", "←", "→", which are surrounded by a rectangle that is located in a bottom part of the display. Another window 301 may be provided which indicates which process steps in the whole process are being currently displayed on the screen.

Figure 6:
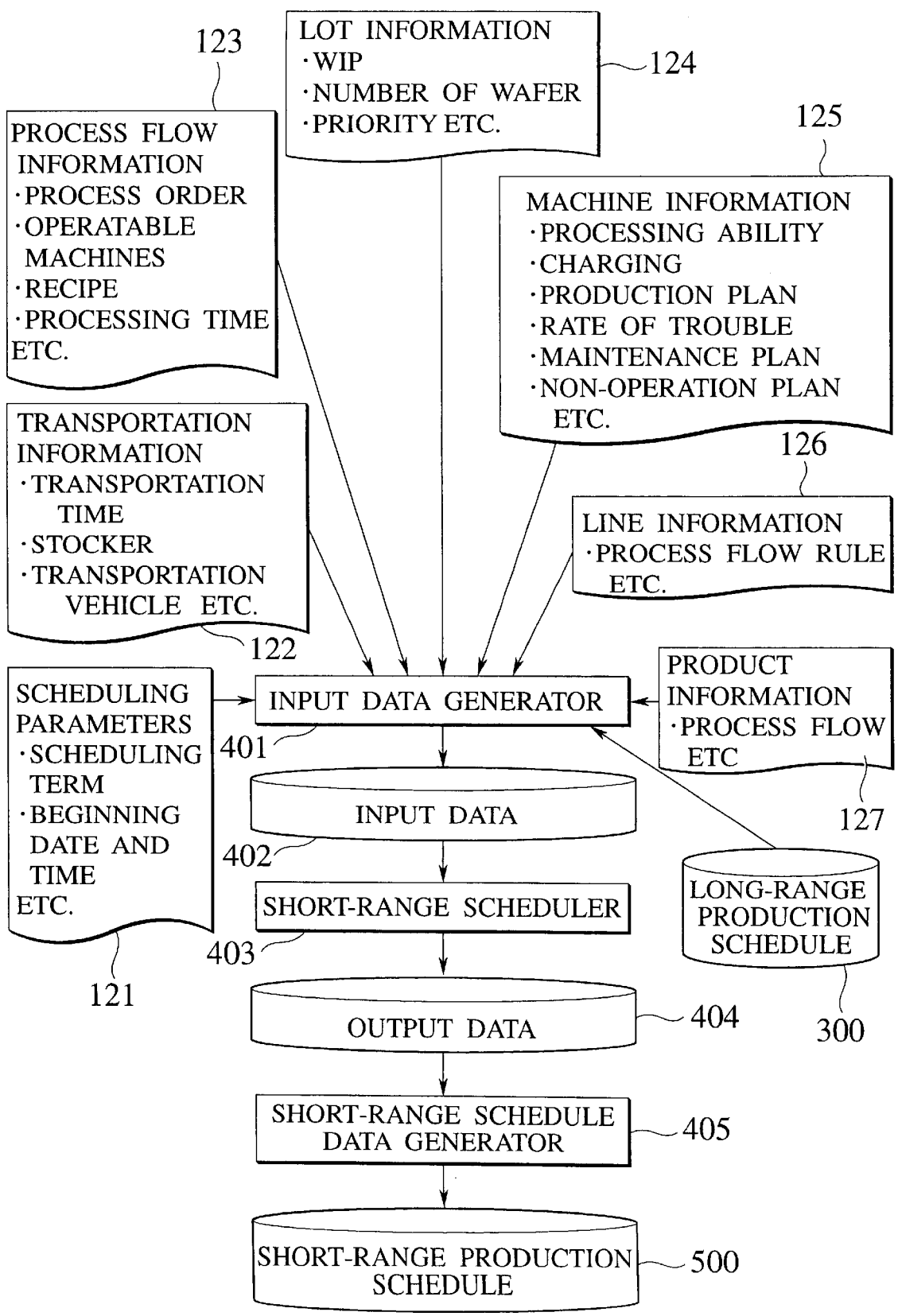
FIG. 6 is a block diagram showing the flow of processing of a short-range production scheduling unit 400 of FIG. 2.

FIG. 6 is a block diagram showing the flow of processing of the short-range production scheduling unit 400. Initially, the short-range production scheduling information 120 includes scheduling parameters 121, transportation information 122 concerning transportation of lots, process flow information 123, lot information 124, machine information 125, production line information 126, and product information 127.

The scheduling parameters 121 may include the scheduling term, the beginning date and time at which the schedule starts being carried out, and other information. The transportation information 122 may include the transportation time, information on a stocker and a transportation vehicle, and others. The process flow information 123 may include the order of process steps (process flow), information on a set of machines that may be used for processing, recipe, processing time, and other information. The lot information 124 may include the number of WIP (Work In Process) wafers in the current process step, the priority factor, and other information. The machine information 125 may include the processing ability, charging, production plan of each machine, the rate of troubles, maintenance plan, non-operation plan of each machine, and other information. The line information 126 may include the process flow rules, and other information. The product information 127 may include the process flow to be used, yield, and other information.

While the long-range production scheduling unit 200 as described above uses the rate of operation of the machine as input data, based on the theory of probability, the short-range production scheduling unit 400 uses a plan of actual machine operation during a simulation period, as input data, to provide the machine information 125. One example will be shown below.

EXAMPLE

Long-range production plan (rate of operation):
  operating=75% non-operating=25%
Short-range production plan (non-operating plan):
  Maintenance 1=13:30–14:20
  Maintenance 2=17:15–20:00

By suitably using the short-range production information 120 and the long-range production schedule 300, an input data generator 401 for short-range scheduling generates data 402 to be received by a short-range scheduler 403. The short-range scheduler 403 then performs short-range scheduling, using the schedule data 402, and generates scheduler output data 404. Then, a short-range schedule data generator 405 generates a short-range production schedule 500, based on the output data 404 received from the short-range scheduler 403.

The simulator incorporates, as its internal function, an algorithm that realizes the short-range production schedule in accordance with the result of the long-range production scheduling unit 200. The result of the short-range production scheduling is generated as a scheduled work list for each machine. The work list is in the form of a Gantt chart that enables the operator, at the time of beginning of a work shift, to grasp work schedules in the present shift and the next shift. The Gantt chart may be produced for each shift.

Figure 7:
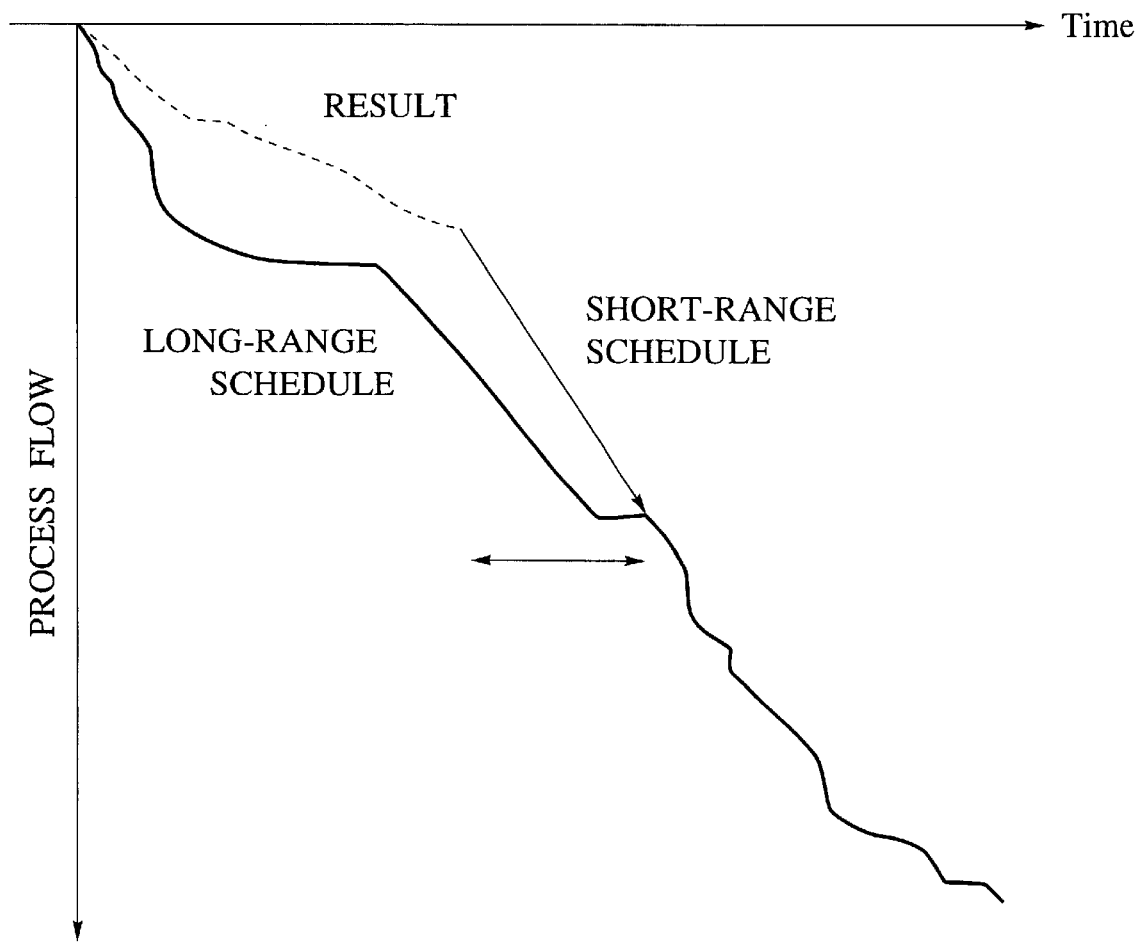
FIG. 7 is a graph useful in explaining the short-range production scheduling unit 400 of FIG. 2.

FIG. 7 is a graph useful in explaining short-range production scheduling. In FIG. 7, the vertical axis represents the process flow, and the horizontal axis represents the time. Each lot proceeds from one process to another (next process) as the plotted line in FIG. 7 goes downwards, and the time proceeds as the line goes to the right as viewed in the same figure. In the short-range production scheduling unit 400, the unit reads or receives the state of the production line at a certain point of time, scheduled state of the line after that point of time, and a parameter (delivery date) used for controlling the progress of each lot to be close to the long-range schedule, and simulates the progress of the lot over a designated period of time. In this connection, the data read into the simulator are basically similar to those in the case of the long-range production scheduling.

Figure 8:
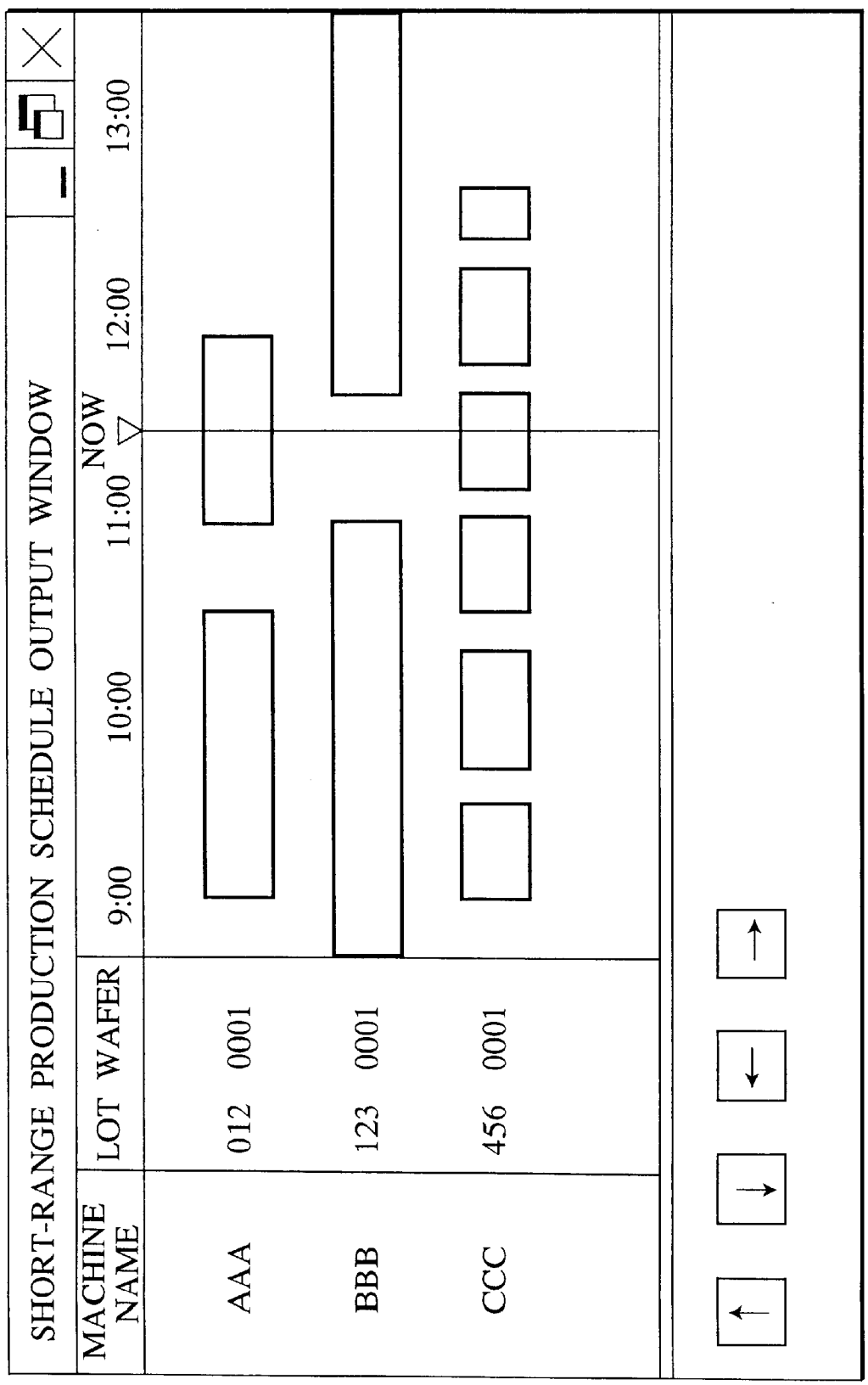
FIG. 8 is an example of a screen image showing a short-range production schedule.

FIG. 8 is an example of screen image showing an output result of short-range production scheduling that may be actually referred to by the user. In this example, a scheduled work list for each machine is displayed in the form of a Gantt chart. In the chart displayed on the screen, the vertical axis indicates the name of each machine, and the horizontal axis indicates the time, and is graduated in hours. The chart on the screen may be scrolled up and down, and to the left and the right, by clicking a selected one of buttons denoted by "↑", "↓", "←", "→", which are surrounded by a rectangle located in a bottom part of the screen, so as to scroll the machine names and the time.

Figure 9:
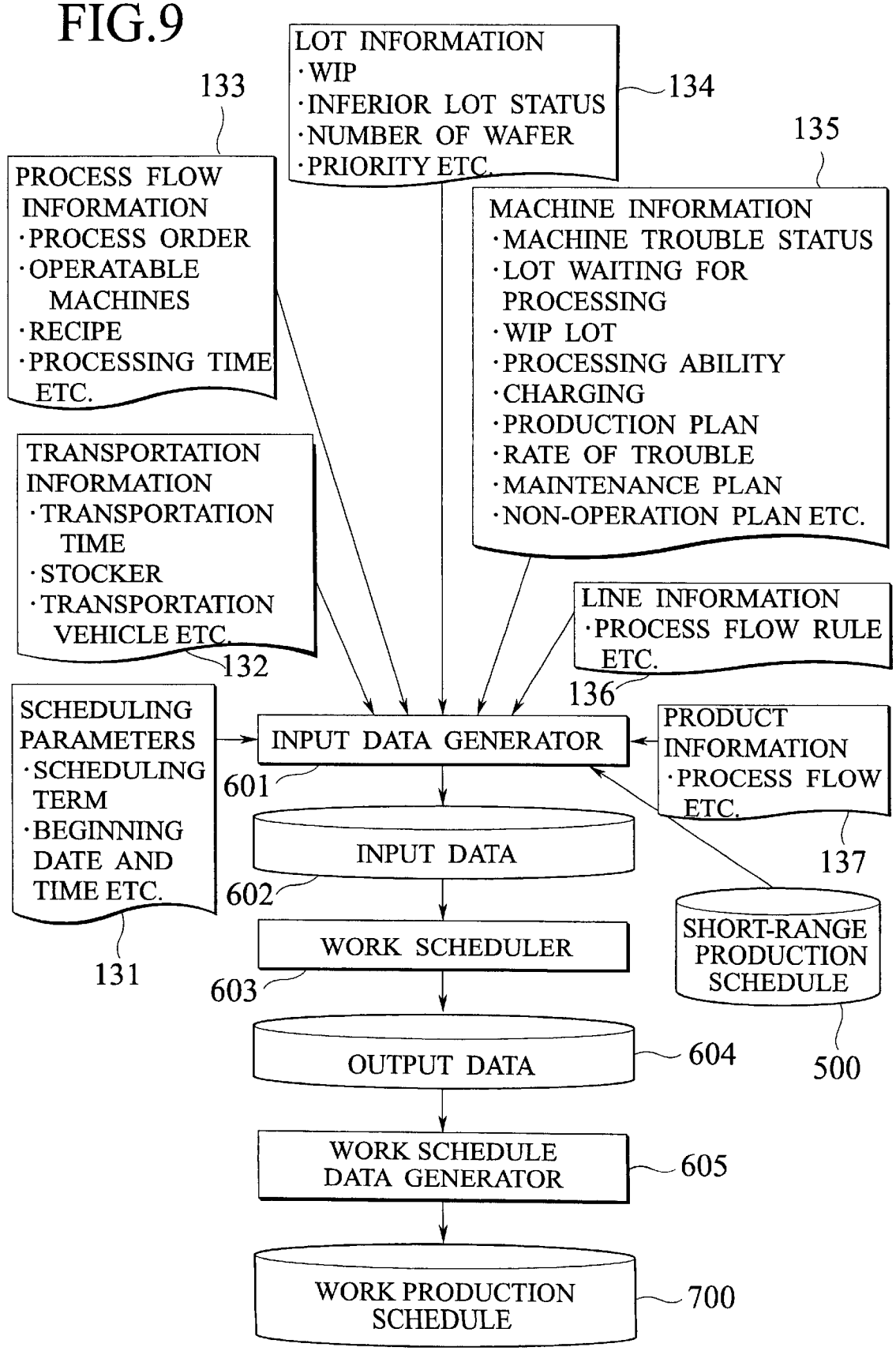
FIG. 9 is a block diagram showing the flow of processing of a work scheduling unit 600 of FIG. 2.

FIG. 9 is a block diagram showing the flow of processing of the work scheduling unit 600. Initially, the work scheduling information 130 may include scheduling parameters 131, transportation information 132, process flow information 133, lot information 134, machine information 135, production line information 136, and product information 137.

The scheduling parameters 131 may include the scheduling term, the beginning date and time at which the schedule starts being carried out, and other information. The transportation information 132 may include the transportation time, information on a stocker and a transportation vehicle, and others. The process flow information 133 may include the order of process steps (process flow), information on a set of machines that may be used for processing, recipe, processing time, and other information. The lot information 134 may include WIP (Work In Process) lots in the current process step, any abnormality of lots, the number of the WIP wafers, the priority factor, and other information. The machine information 135 may include any trouble of the apparatuses or machines, lots waiting for processing, WIP (Work In Process) lots (including the remaining processing time), processing ability, charging, production plan of each machine, maintenance plan, non-operation plan of each machine, and other information. The line information 136 may include the process flow rules,- and other information. The product information 137 may include the process flow to be used, yield, and other information.

By suitably using the above work scheduling information and the short-range production schedule 500, an input data generator 601 for work scheduling generates data 602 to be received by a work scheduler 603. The work scheduler 603 then performs work scheduling, using the schedule data 602, and generates scheduler output data 604. Then, a work schedule data generator 605 generates work schedules 700, based on the scheduler output data 604.

Figure 10:
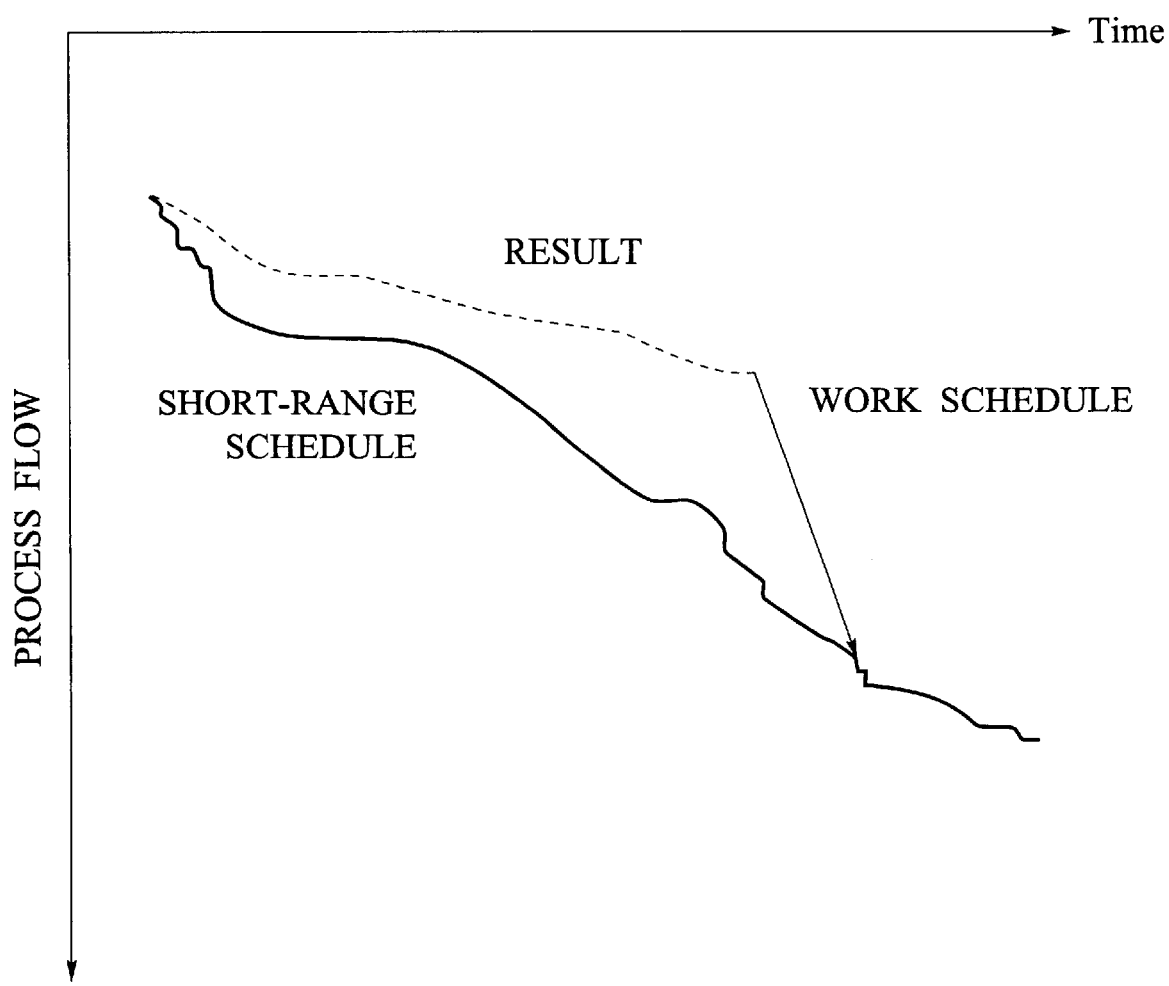
FIG. 10 is a graph useful in explaining the work scheduling unit 600 of FIG. 2.

FIG. 10 is a graph useful in explaining work scheduling. In FIG. 10, the vertical axis represents the process flow, and the horizontal axis represents the time. Each lot proceeds from one process to the next one as the plotted line in FIG. 10 goes downwards, and the time proceeds as the line goes to the right as viewed in the same figure. The work scheduling unit 600 schedules operations of each machine, and generates suitable commands to the operator so as to fulfill the short-range production schedule. Where any trouble arises in a machine or lot, causing a problem in fulfilling the short-range production schedule of the upper stage, the work scheduling unit 600 flexibly and promptly revises the work schedule. The scheduling unit 600 keeps monitoring such unexpected troubles, and performs rescheduling each time a trouble takes place. The result of work scheduling is output as a work list for each machine, as in the short-range production scheduling. As compared with the Gantt chart of the short-range production schedule, work scheduling is performed with respect to several operations of each machine, and the operator proceeds with works according to this list.

Figure 11:
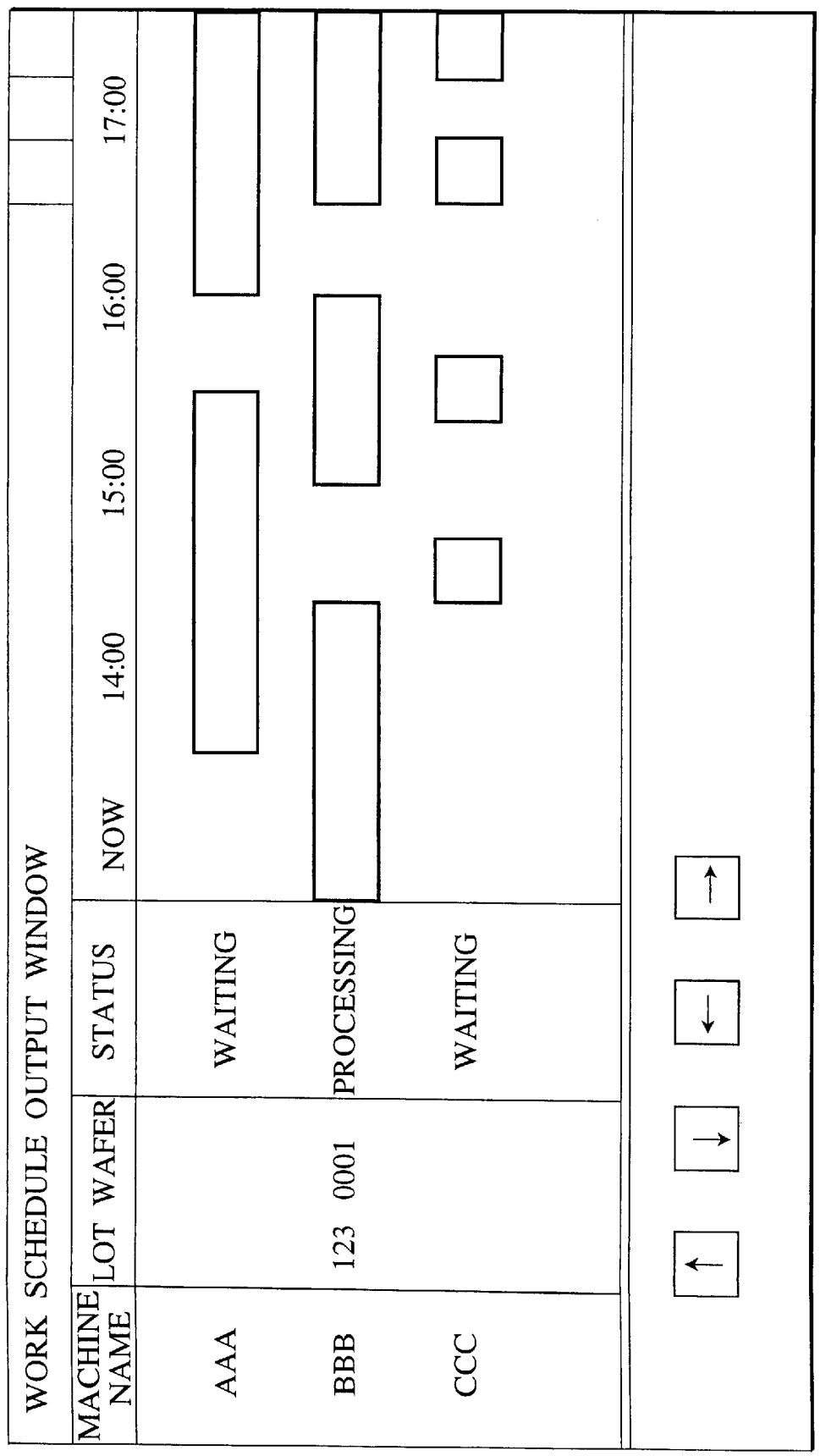
FIG. 11 is an example of a screen image showing a work schedule.

FIG. 11 is an example of screen image showing an output result of work scheduling that may be actually referred to by the user. In this example, a scheduled work list for each machine is displayed in the form of a Gantt chart. In the chart displayed on the screen, the vertical axis indicates the name of each machine, and the horizontal axis indicates the time, and is graduated in hours. The chart on the screen may be scrolled up and down, and to the left and the right, by clicking a selected one of buttons denoted by "↑", "↓", "←", "→", which are surrounded by a rectangle located in a bottom part of the screen, so as to scroll the machine names and the time.

Figure 12:
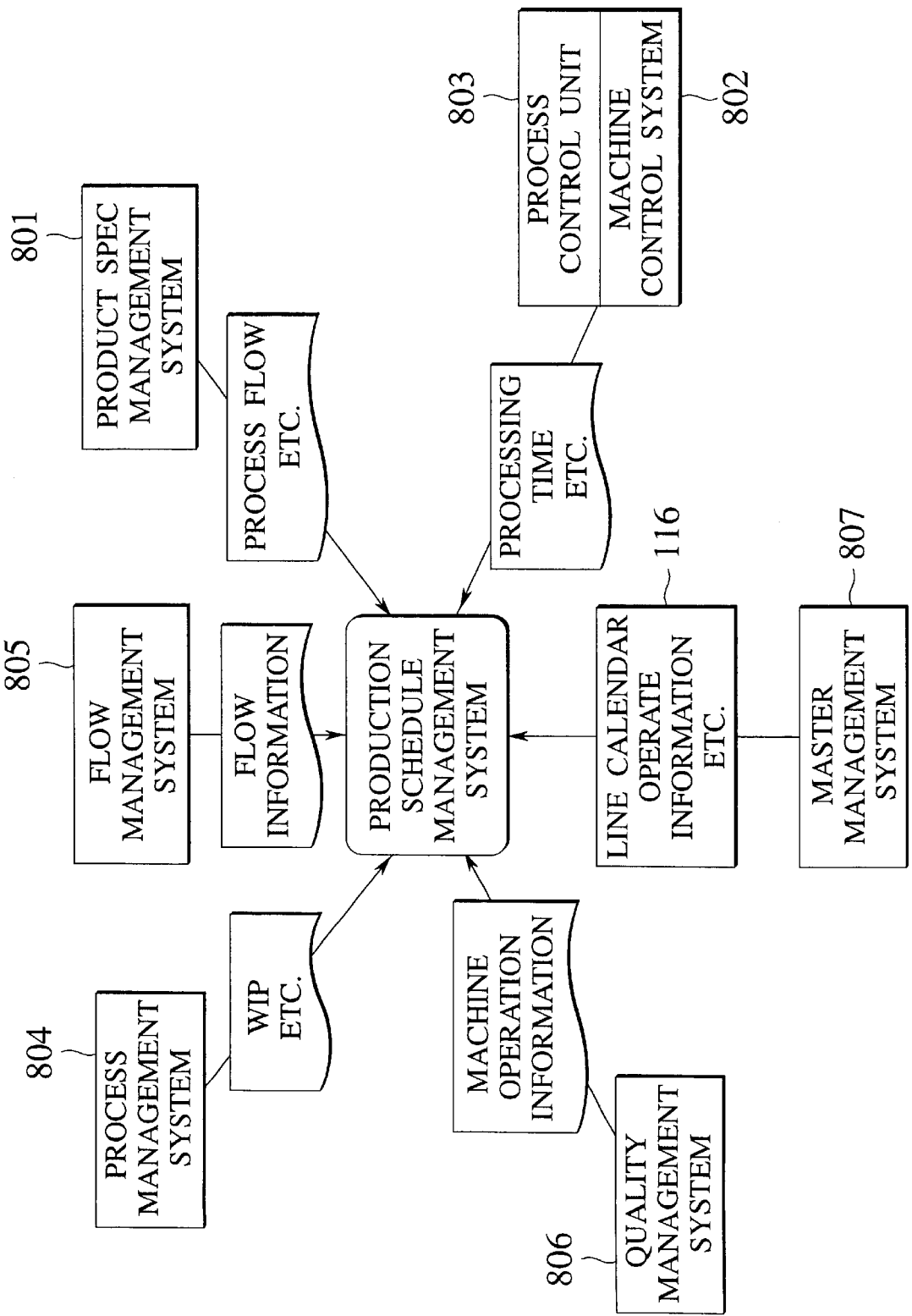
FIG. 12 is a view useful in explaining a method of transmitting input data to the production scheduling management system of the present embodiment.

FIG. 12 is a schematic view useful in explaining the manner in which input data are transmitted to the production scheduling management system of the present embodiment. A product specification management system 801 serving as a system for managing process conditions and recipe of each process produces information on the flow (process flow) of processes of each lot. Information on the processing time of each process is produced by a machine control system 802 that serves to manage recipe and production plan of each machine, and a process control system 803 that serves to calculate the processing time based on parameters for controlling the recipe and process.

A process management system 804 that serves to manage the progress of lots produces information on WIP (Work In Process) lots that are currently processed in the production line. An introduction management system 805 that serves to manage introduction or setting of lots produces information on lots that are to be introduced or set into machines. A quality control system 806 that serves to control the quality of machines produces information on operations of machines. A master management system 807 that serves to manage these data produces information on the ability of each machine, production line calendar, and operators.

As described above, the production scheduling management system of the present embodiment performs production scheduling in a hierarchical manner, i.e., in the three stages, so as to achieve the progress of lots with high efficiency, and make preparations, such as production planning, with high efficiency so as to properly carries out operations as scheduled. The present production scheduling system yields a great effect if it is introduced into recent production lines that aim at shortened production terms.

In the present embodiment, the production scheduling is accomplished through simulation, taking the delivery date into consideration, and thus the progress of lots can be scheduled in terms of the time. Thus, the short-range production schedule and work schedule may be produced with respect to lots that have not reached the process in question, as well as lots that are currently waiting for processing.

Since the short-range production scheduling as an intermediate stage enables the operator to grasp his/her own work schedule in advance, the operator is able to make preparations, such as production planning, with high efficiency, and properly carries out operations according to the schedule. Also, high-priority lots are smoothly passed on from one process step to another, and charging of a machine with lots to be processed under the same conditions can be done with high efficiency. Since the maintenance work can be scheduled based on the information obtained by short-range production scheduling, it is possible to minimize an influence of maintenance on the progress of lots.

Where there arises any fault in a machine or any abnormality in a lot, for example, only the work schedule needs to be reviewed and revised, without changing the short-range and long-range production schedules. Thus, since the scheduling system is present in a hierarchical fashion, such fault or abnormality can be promptly and flexibly handled in accordance with the actual movement of the production line. Where there arises any deviation of the result of production from the schedule, such deviation can be promptly absorbed or corrected since the short-time production schedule is often revised or rewritten for each shift.

A program that realizes the production scheduling management as described above may be stored into a recording medium. The program stored in the recording medium is read into a computer system, so that the above-described production scheduling management can be realized by executing the program while controlling the computer. The recording medium includes such devices as a memory device, magnetic disk device, and an optical disk device, that are able to record the program. For example, the recording medium consists of CD-ROM, DVD, ZIP, JAZ, MO, DAT, or the like.

Figure 13:
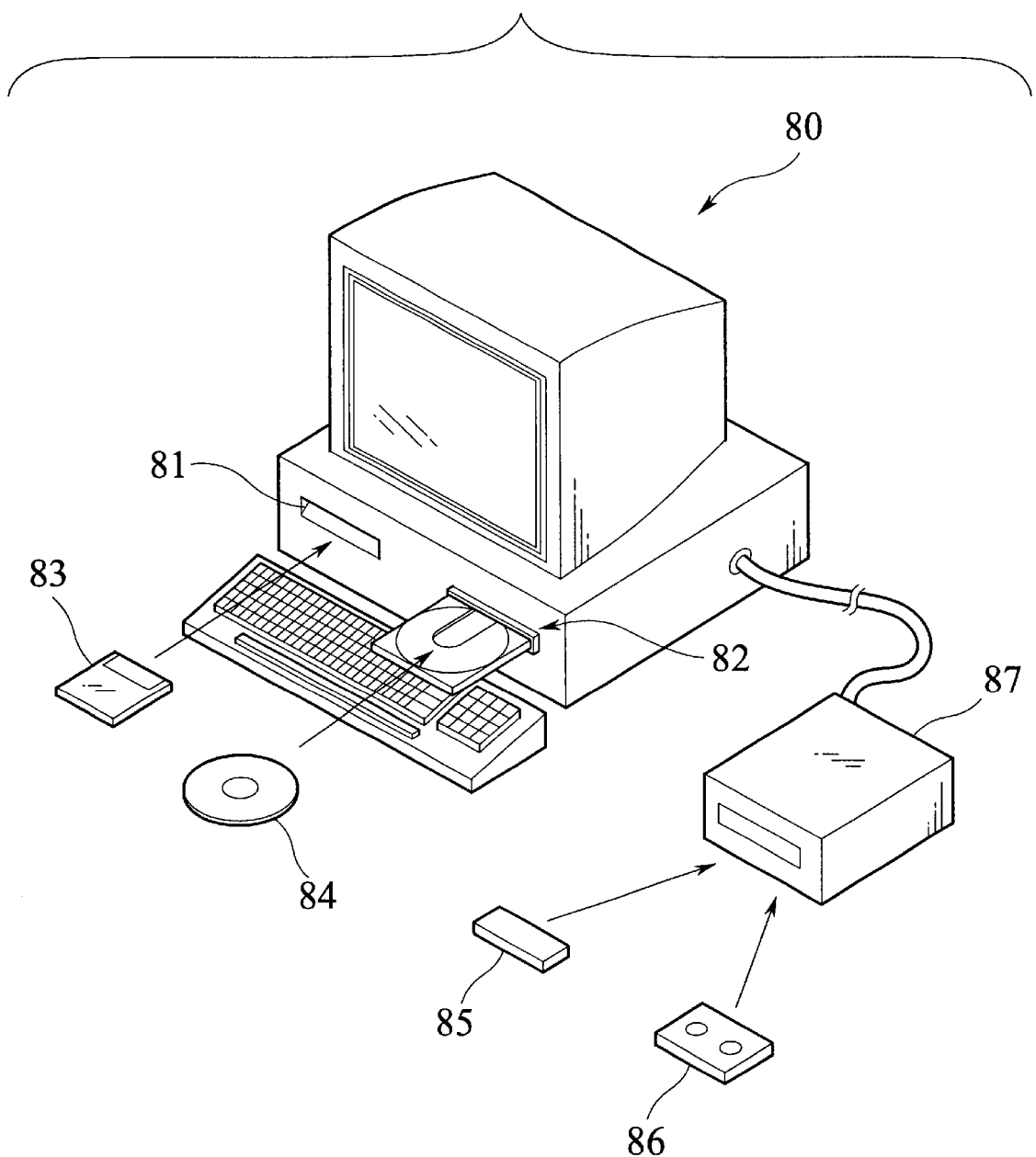

FIG. 13 schematically shows one example of a computer system that reads a program stored in the recording medium, and performs production scheduling management according to the procedure described in the program. The computer system 80 is provided, at a front face of its main body, with a floppy disk drive 81, and CD-ROM or DVD drive 82. To the computer system 80 is connected a drive device 87 that permits reading and writing of a recording medium, such as ZIP, JAZ, MO or DAT. A floppy disk 83 as a magnetic disk device, or CD-ROM or DVD 84 as an optical disk device, is inserted into each drive through a slot, and a certain reading operation is performed, so that the program stored in the recording medium can be installed in the computer system. Similarly, each type of medium 85, 86 may be inserted into a slot of a drive device 87, and a certain reading operation may be performed. In this manner, the production scheduling management can be performed by the computer system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A production scheduling management system, comprising:
    a long-range production scheduling unit that receives long-range production scheduling information including at least information on a delivery date of each lot, produces a long-range production schedule based on the delivery date of said each lot, and outputs a long-range production schedule;
    a short-range production scheduling unit that receives the long-range production schedule, and short-range production scheduling information, produces a short-range production schedule so as to fulfill the long-range production schedule, and outputs a short-range production schedule; and
    a work scheduling unit that receives the short-range production schedule and work scheduling information, produces a work schedule so as to fulfill the short-range production schedule, while taking account of conditions of each machine and conditions of each lot, and generates at least one work schedule.

2. A production scheduling management system as claimed in claim 1, wherein said long-range production scheduling unit comprises:

an input data generator for long-range scheduling, which receives the long-range production scheduling information including scheduling parameters, transportation information, process flow information, lot information including at least the delivery date of each lot, machine information, production line information, and product information, and produces a scheduler input data;

a long-range scheduler that performs long-range scheduling based on the scheduler input data produced by said input data generator, and generates scheduler data; and a long-range schedule data generator that produces the long-range production schedule, using the scheduler data generated by said long-range scheduler.

3. A production scheduling management system as claimed in claim 1, wherein said work scheduling unit receives the short-range production schedule and the work scheduling information, produces a work schedule so as to fulfill the short-range production schedule, while taking account of conditions of each machine and conditions of each lot, and rewrite the work schedule when a problem occurs which impedes implementation of the short-range production schedule.

4. A production scheduling management method comprising:

receiving long-range production scheduling information including at least information on a delivery date of at least one lot;

producing a long-range production schedule based on the delivery date of each lot;

outputting a long-range production schedule;

receiving short-range production scheduling information;

producing a short-range production schedule so as to fulfill the long-range production schedule;

outputting a short-range production schedule;

receiving a work scheduling information;

producing a work schedule so as to fulfill the short-range production schedule, while taking into account conditions of at least one machine and conditions of each lot; and generating at least one work schedule.

5. The method of claim 4 further comprising producing a scheduler input data, wherein long-range production scheduling information includes scheduling parameters, transportation information, process flow information, lot information including at least the delivery date of each lot, machine information, production line information, and product information.

6. The method of claim 4 wherein generating at least one work schedule includes fulfilling the short-range production schedule, while taking into account conditions of each machine and conditions of each lot and rewriting the work schedule when a problem occurs which impedes implementation of the short-range production schedule.

7. A computer-readable storage medium that stores a production scheduling management program comprising:

receiving long-range production scheduling information including at least information on a delivery date of at least one lot;

producing a long-range production schedule based on the delivery date of each lot;

outputting a long-range production schedule;

receiving short-range production scheduling information;

producing a short-range production schedule so as to fulfill the long-range production schedule;

outputting a short-range production schedule;

receiving a work scheduling information;

producing a work schedule so as to fulfill the short-range production schedule, while taking into account conditions of at least one machine and conditions of each lot; and generating at least one work schedule.

8. The computer-readable storage medium of claim 7, the production scheduling program further comprising producing a scheduler input data, and wherein the long-range production scheduling information includes scheduling parameters, transportation information, process flow information, lot information including at least the delivery date of each lot, machine information, production line information, and product information.

9. The computer-readable storage medium of claim 7, wherein generating a work schedule includes fulfilling the short-range production schedule, while into taking account conditions of each machine and conditions of each lot, and rewriting the work schedule when a problem occurs which impedes implementation of the short-range production schedule.

* * * * *

UNITED STATES PATENT AND TRADEMARK OFFICE
CERTIFICATE OF CORRECTION

PATENT NO. : 6,438,436 B1
DATED : August 20, 2002
INVENTOR(S) : Hohkibara et al.

It is certified that error appears in the above-identified patent and that said Letters Patent is hereby corrected as shown below:

Column 12,
Line 40, change "into taking" to -- taking into --.

Signed and Sealed this

Fourth Day of February, 2003

JAMES E. ROGAN
*Director of the United States Patent and Trademark Office*